(12) United States Patent
Song et al.

(10) Patent No.: US 11,137,971 B2
(45) Date of Patent: Oct. 5, 2021

(54) DATA PACKING CIRCUIT AND DATA PACKING METHOD

(71) Applicant: REALTEK SEMICONDUCTOR CORP., Hsinchu (TW)

(72) Inventors: Ying-Ying Song, Suzhou (CN); Chien-Hsun Lu, Hsinchu (TW); Yi-Han Peng, Taichung (TW); Chun-Chieh Chan, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/083,445

(22) Filed: Oct. 29, 2020

(65) Prior Publication Data
US 2021/0208838 A1    Jul. 8, 2021

(30) Foreign Application Priority Data

Jan. 6, 2020   (CN) .......................... 202010010544.1

(51) Int. Cl.
*G06F 3/16*         (2006.01)
*H04N 21/4363*      (2011.01)
*H04N 5/765*        (2006.01)
*H04N 5/60*         (2006.01)

(52) U.S. Cl.
CPC ............. *G06F 3/162* (2013.01); *H04N 5/602* (2013.01); *H04N 5/765* (2013.01); *H04N 21/43635* (2013.01)

(58) Field of Classification Search
CPC . G06F 3/16; H04N 5/60; H04N 5/765; H04N 21/4363; H04N 21/4365
USPC .......................................................... 700/94
See application file for complete search history.

(56) References Cited

U.S. PATENT DOCUMENTS

| | | | | |
|---|---|---|---|---|
| 2019/0356881 | A1* | 11/2019 | Huang | .................... H04N 7/015 |
| 2020/0029121 | A1* | 1/2020 | Zhang | .................. H04N 21/434 |
| 2020/0092621 | A1* | 3/2020 | Suzuki | .................... H01R 24/60 |

* cited by examiner

*Primary Examiner* — Melur Ramakrishnaiah
(74) *Attorney, Agent, or Firm* — Li & Cai Intellectual Property (USA) Office

(57) ABSTRACT

A data packing circuit and a data packing method operated in a high definition multimedia interface (HDMI) transmitter that adopts a fixed rate link mode are provided. The data packing circuit can output a plurality of FRL super blocks at a plurality of unit times. In the data packing method, multiple valid data inputted to the data packing circuit at the $(i)^{th}$ unit time are mapped to a plurality of FRL characters, and the FRL characters are stored to the first or the second buffer. At the same time, an amount of tri-byte of the multiple valid data is counted for determining number and positions for inserting gap characters to form the $(i)^{th}$ FRL super block, which is outputted at the $(i+1)^{th}$ unit time. The numeral 'i' is a positive integer.

8 Claims, 2 Drawing Sheets

DATA PACKING CIRCUIT AND DATA PACKING METHOD

CROSS-REFERENCE TO RELATED PATENT APPLICATION

This application claims the benefit of priority to China Patent Application No. 202010010544.1, filed on Jan. 6, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a data packing circuit and a data packing method, and more particularly to the data packing circuit and the data packing method operated in a HDMI transmitter that adopts a Fixed Rate Link (FRL) mode.

BACKGROUND OF THE DISCLOSURE

FRL (Fixed Rate Link) mode is a modern transmission mode defined in HDMI 2.1 specifications. An HDMI transmitter adopting FRL mode not only converts data under a TMDS (Transition Minimized Differential Signaling) mode defined in old specifications (e.g., HDMI 2.0 or 1.4 specifications) to the FRL mode, but also packages the data with a packet format under the FRL mode. Thus, it has become an important issue in the art to develop a new data packing circuit and a data packing method for the HDMI transmitter adopting the FRL mode.

SUMMARY OF THE DISCLOSURE

In response to the above-referenced technical inadequacies, the present disclosure provides a data packing circuit and a data packing method.

The data packing circuit is used in an HDMI transmitter adopting FRL mode. The data packing circuit outputs multiple FRL super blocks at multiple unit times. The data packing circuit includes an FRL packing circuit, a first buffer, a second buffer, a unit time generating circuit, a data mapping circuit, and a computation control circuit. The data mapping circuit is used to map multiple valid data at $(i)^{th}$ unit time to multiple FRL characters. The FRL characters are stored to the first buffer or the second buffer. The computation control circuit simultaneously counts an amount of tri-byte of the multiple valid data for determining number and positions for inserting the gap characters. The FRL packing circuit constitutes $(i)^{th}$ FRL super block, and the $(i)^{th}$ FRL super block is outputted at $(i+1)^{th}$ unit time. The numeral 'i' is a positive integer.

In addition, a data packing method is also provided in the disclosure. The data packing method is operated in an HDMI transmitter that adopts FRL mode. The HDMI transmitter includes a data packing circuit that outputs multiple FRL super blocks at multiple unit times. In the data packing method, at $(i)^{th}$ unit time, the multiple valid data inputted to the data packing circuit are mapped to multiple FRL characters. The FRL characters are configured to be stored to the first buffer or the second buffer. Simultaneously, an amount of tri-byte of the multiple valid data is counted so as to decide quantities and positons for inserting gap characters for constituting the $(i)^{th}$ FRL super block. The FRL super block is outputted at $(i+1)^{th}$ unit time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
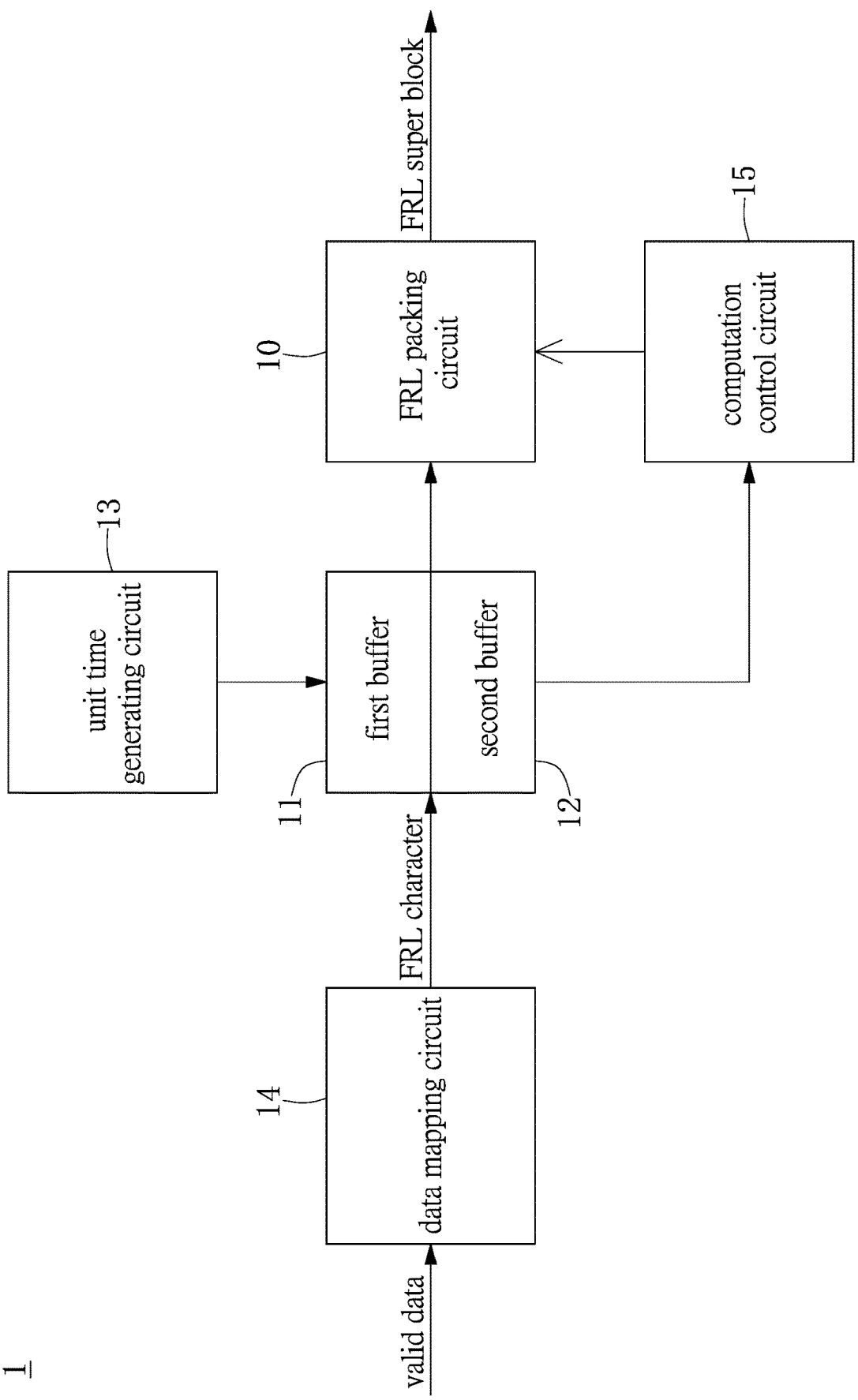
FIG. 1 is a block diagram depicting a data packing circuit according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

It should be first noted that the packets to be transmitted under an FRL (Fixed Rate Link) mode are named FRL super block having a fixed size and can be composed by valid data and invalid gap characters. An allocation ratio of the valid data to the gap characters may be adjusted according to a physical link rate and the conditions of transmission. That is to say, even if the FRL mode is characterized to have a fixed transmission bandwidth, the gap characters may still be allocated with a high proportion under some specific conditions of transmission. Under another specific condition of transmission, the received data may be unable to be transmitted in time at a specific frequency. According to HDMI (High Definition Multimedia Interface) 2.1 specifications, a difference between a real-time rate for outputting the valid data and an average rate for inputting the valid data does not allow too much deviation and must meet a data flow metering requirement of a fixed rate link (FRL). Therefore, an HDMI transmitter adopting FRL mode needs a buffer to implement a packing mechanism of the FRL super block.

However, a larger buffer requires a larger chip area or memory that results in an increased cost. A new data packing circuit and a data packing method are therefore provided. One of the advantages of the data packing circuit provided by this embodiment is using a smaller buffer for reducing cost besides converting the data from a TMDS mode to the FRL mode.

Reference is made to FIG. 1, which shows a block diagram of a data packing circuit of the present disclosure. The data packing circuit 1 includes an FRL packing circuit 10, a first buffer 11, a second buffer 12, a unit time generating circuit 13, a data mapping circuit 14, and a computation control circuit 15. These circuits can be implemented, but not limited to, only by hardware, or by hardware in coordination with firmware or software. In addition, the arrangements of the above-mentioned circuits can be, but not limited to, integrated or separate.

It should be noted that, when a number of lanes (e.g., 3 lane or 4 lane) and a link rate (e.g., 3 GHz, 6 GHz, 8 GHz, 10 GHz or 12 GHz) are decided under the FRL mode, a duration of every FRL super block outputted by the data packing circuit 1 is fixed. Thus, the unit time generating circuit 13 treats the duration of the data packing circuit outputting one FRL super block as a unit time. In other words, the data packing circuit 1 outputs the multiple FRL super blocks at the multiple unit times, in which the length of every unit times is fixed. The length of the unit time is decided according to the number of lanes and the link rate. Further, as shown in FIG. 1, the data mapping circuit 14 is used to map the multiple valid data at $(i)^{th}$ unit time to multiple FRL characters. The FRL characters are configured to be stored to the first buffer 11 or the second buffer 12. The relevant details are not repeated here since the operating principle for mapping the valid data to the FRL characters is well defined according to the HDMI 2.1 specifications. In summary, rather than the conventional technology, the data packing circuit of the present disclosure treats the duration of outputting one FRL super block as a unit time for collecting the valid data.

On the other hand, the computation control circuit 15 simultaneously counts an amount of tri-byte of the multiple valid data so as to decide number and positions for inserting the gap characters. The FRL packing circuit 10 then constitutes (or packages) a $(i)^{th}$ FRL super block that is configured to be outputted at $(i+1)^{th}$ unit time. The 'i' is a positive integer.

For example, the data mapping circuit 14 maps the multiple valid data to be inputted at a first unit time to multiple FRL characters. The FRL characters are stored to the first buffer 11. At the same time, the computation control circuit 15 counts an amount of tri-byte of the multiple valid data so as to decide the number and positions of the gap characters to be inserted. The FRL packing circuit 10 therefore, constitutes a first FRL super block. The first FRL super block can be outputted at a second unit time that is directly next for outputting the super block. It should be noted that the multiple valid data can include video data, data packets, and/or control signals. It should be noted that a person having ordinary skill in the art of the invention can understand that the number and positions of the gap characters to be inserted can be decided according to the amount of tri-byte of the multiple valid data, therefore, the related details are not repeated here.

Similarly, while the data packing circuit 1 outputs a first FRL super block, the data mapping circuit 14 maps the multiple valid data to be inputted at a second unit time to multiple FRL characters. The FRL characters are stored to the second buffer 12. Similarly, a second FRL super block constituted by the FRL packing circuit 10 can be outputted at a third unit time. In other words, the first buffer 11 and the second buffer 12 alternately store the FRL characters which are mapped at $(k)^{th}$ unit time and $(k+1)^{th}$ unit time in a ping-pong mode. The numeral 'k' is an odd integer larger than zero. Therefore, by alternatingly operating the two alternate buffers, the packing of the continuous FRL characters can be completed.

In an example, the amount of tri-byte of the multiple valid data that one FRL super block may contain is 1337 (2006*16/24). However, when the transmission bandwidth to be applied is not enough for the load of the transmission of video, the HDMI transmitter can borrow a transmission bandwidth from a blanking period. As the HDMI 2.1 specifications indicate, a maximum amount of the tri-byte that the HDMI transmitter can borrow from another period during the transmission of video or the blanking period is 400. In other words, within a unit time of the present embodiment, the maximum amount of the tri-byte of the valid data is 1737 (1337+400). Therefore, a size of each of the buffers needs to be only enough to store 1737 of the amount of tri-byte.

Further, the computation control circuit 15 counts the number of tri-byte of the valid data received by the data packing circuit 1 at every unit time. If the number of tri-byte of the valid data inputted is smaller than 1337, some additional gap characters are required to be inserted to the FRL super block during packing. Similarly, the computation control circuit 15 further decides a number of map characters to be added to the FRL super block according to the amount of tri-byte of the multiple valid data, and the FRL packing circuit 10 constitutes the $(i)^{th}$ FRL super block that is outputted at $(i+1)^{th}$ unit time. That is to say, in the method, the gap characters and/or the map characters are configured to be arranged into the FRL super block evenly for ensuring that the average rates of inputting and outputting the valid data can be as consistent as possible.

On the other hand, if the amount of the tri-byte of the multiple valid data is larger than 1337, it shows that the current transmission bandwidth is not enough to transmit the valid data in time. A transmission bandwidth from a next FRL super block is then borrowed. For example, it is not necessary to insert any gap characters in the FRL super block during packing so as to transmit 2006 FRL characters. The remaining FRL characters can be transmitted by the next FRL super block.

When the computation control circuit 15 processes a next FRL super block, the computation control circuit 15 subtracts a previous remaining amount of tri-byte of the valid data from the amount 1337 for checking if the remaining transmission bandwidth is enough to transmit the amount of tri-byte of the valid data at this time. If the remaining transmission bandwidth is not enough to transmit the amount of tri-byte, the remaining FRL characters can be transmitted in a next FRL super block. In the data packing circuit, the size of each of the buffers can be configured to be the size of a single FRL super block plus a borrowed size that is allowed. In the present embodiment, the remaining valid data that is not yet sent in for transmission can be transmitted in the next FRL super block. Therefore, the data packing method of the present disclosure shortens a time delay (or, a reference shift) from the time of inputting the valid data to the time of outputting the FRL super block. In one aspect, the time delay cannot exceed a value obtained by multiplying the size no greater than a single FRL super block by a physical link rate.

Figure 2:
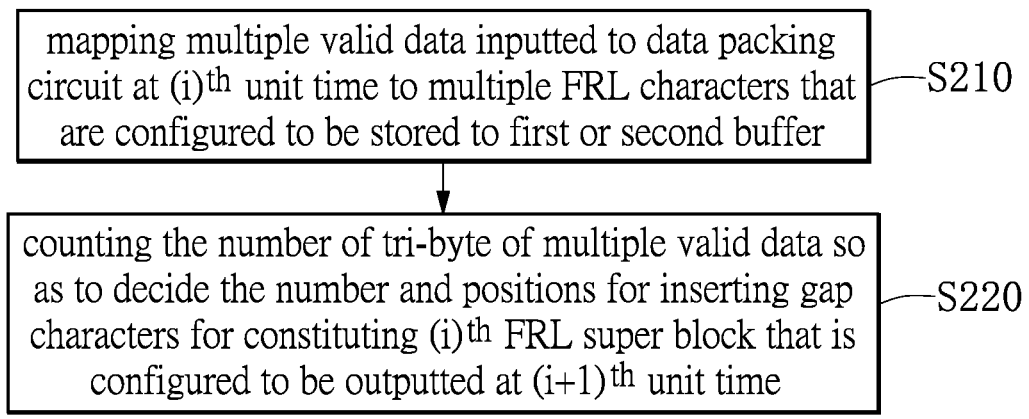
FIG. 2 shows a flow chart of a data packing method according to one embodiment of the disclosure.

Consequently, for further describing an operating flow of the data packing circuit 1, an implementation of the data packing method is provided in the present disclosure. Reference is made to FIG. 2, which shows a flow chart describing the data packing method according to one embodiment of the disclosure. The data packing method described in FIG. 2 can be performed in the data packing circuit 1 shown in FIG. 1. However, the present disclosure is not limited in that the data packing method is shown in FIG. 2 can only be performed by the data packing circuit 1 of FIG. 1. In short, the data packing method described in FIG. 2 can be applied to the HDMI transmitter adopting the FRL mode, and the HDMI transmitter includes the data packing circuit that is able to output multiple FRL super blocks at multiple unit times. The details of the process are the same as described in the aforementioned embodiments and will be described in brief and not in detail herein.

As FIG. 2 shows, in step S210, the multiple valid data inputted to the data packing circuit at $(i)^{th}$ unit time are mapped to multiple FRL characters. The FRL characters are stored to a first buffer or a second buffer. In step S220, at the same time, an amount of tri-byte of the multiple valid data is counted for deciding the number and positions for inserting gap characters. The inserted gap characters constitute $(i)^{th}$ FRL super block. The $(i)^{th}$ FRL super block can be outputted at $(i+1)^{th}$ unit time. That is, step S210 and step S220 do not conflict with each other but can be performed in parallel. Further, if the amount of tri-byte of the valid data inputted is larger than 1337, the data packing circuit borrows a transmission bandwidth from a next FRL super block. The related details are no longer repeated here since the details have been described in the above embodiments.

In conclusion, the embodiments of the present disclosure provides a data packing circuit and a data packing method that is used in an HDMI transmitter adopting FRL mode, enabling the HDMI transmitter to convert data from a TMDS mode to the FRL mode. One of the advantages of the data packing circuit and the data packing method of the present disclosure is to allow use of two smaller buffers for reducing cost. The two buffers alternately work for packing FRL super blocks continuously. Different from the conventional technology, the data packing circuit and the data packing method treats the duration of outputting one FRL super block as a unit time for receiving valid data. The gap characters and/or map characters are configured to be evenly inserted to the FRL super block for ensuring the average rates of inputting valid data and outputting valid data can be as consistent as possible. In other words, for meeting the requirements of FRL data flow metering, the data packing circuit and the data packing method of the present disclosure allow the valid data to be transmitted to an FRL receiver with a smoothest throughput for optimizing the compatibility between the transmitter and the FRL receiver.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A data packing circuit, used in an HDMI transmitter adopting FRL mode and outputting multiple FRL super blocks at multiple unit times, wherein the data packing circuit comprises:
   an FRL packing circuit;
   a first buffer;
   a second buffer;
   a unit time generating circuit;
   a data mapping circuit used to map multiple valid data at $(i)^{th}$ unit time to multiple FRL characters and store the multiple FRL characters to the first buffer or the second buffer; and
   a computation control circuit used to simultaneously count an amount of tri-byte of the multiple valid data, so as to determine a quantity and positions of gap characters to be inserted, constitute the $(i)^{th}$ FRL super block through the FRL packing circuit, and output the $(i)^{th}$ FRL super block at $(i+1)^{th}$ unit time; wherein 'i' is a positive integer;
   wherein the first buffer and the second buffer alternately store the FRL characters which are mapped at $(k)^{th}$ unit time and $(k+1)^{th}$ unit time in a ping-pong mode; wherein 'k' is an odd integer greater than 0.

2. The data packing circuit according to claim 1, wherein each of the unit times has a fixed length and the length is determined according to a quantity of lanes and a link rate.

3. The data packing circuit according to claim 1, wherein the multiple valid data include video data, data packets, and/or control signals.

4. The data packing circuit according to claim 1, wherein the computation control circuit determines a number of map characters to be added to the FRL super block according to the amount of tri-byte of the multiple valid data for the FRL packing circuit to constitute the $(i)^{th}$ FRL super block that is outputted at $(i+1)^{th}$ unit time.

5. A data packing method adapted to an HDMI transmitter adopting FRL mode, wherein the HDMI transmitter includes a data packing circuit that outputs multiple FRL super blocks at multiple unit times, the data packing method comprising:
   mapping multiple valid data inputted into the data packing circuit at $(i)^{th}$ unit time to multiple FRL characters, and storing the multiple FRL characters to a first buffer or a second buffer; and
   simultaneously counting an amount of tri-byte of the multiple valid data so as to determine a quantity and positions of gap characters to be inserted for constituting the $(i)^{th}$ FRL super block that is outputted at $(i+1)^{th}$ unit time, wherein 'i' is a positive integer;
   wherein the first buffer and the second buffer alternately store the FRL characters which are mapped at $(k)^{th}$ unit time and $(k+1)^{th}$ unit time in a ping-pong mode, and 'k' is an odd integer larger than 0.

6. The data packing method according to claim 5, wherein a length of each of the unit times is fixed and the length is determined according to a number of lanes and a link rate.

7. The data packing method according to claim 5, wherein the multiple valid data include video data, data packets, and/or control signals.

8. The data packing method according to claim 5, further comprising:
   determining a number of map characters to be added to the FRL super block according to the amount of tri-byte of the multiple valid data so as to constitute the $(i)^{th}$ FRL super block that is outputted at $(i+1)^{th}$ unit time.

* * * * *